US012735613B2

(12) United States Patent
Ohira et al.

(10) Patent No.: US 12,735,613 B2
(45) Date of Patent: Sep. 15, 2026

(54) SEALING MEMBER AND METHOD FOR MANUFACTURING THE SAME

(71) Applicant: CANON KABUSHIKI KAISHA, Tokyo (JP)

(72) Inventors: Kazunari Ohira, Shizuoka (JP); Yuu Sasano, Shizuoka (JP); Kenta Katayama, Shizuoka (JP); Kenta Kamikura, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/984,776

(22) Filed: Dec. 17, 2024

(65) Prior Publication Data

US 2025/0207007 A1 Jun. 26, 2025

(30) Foreign Application Priority Data

Dec. 26, 2023 (JP) ................................ 2023-219456

(51) Int. Cl.
*C09K 3/10* (2006.01)
*F16L 25/00* (2006.01)

(52) U.S. Cl.
CPC .... *C09K 3/1009* (2013.01); *C09K 2003/1084* (2013.01); *F16L 25/0081* (2013.01)

(58) Field of Classification Search
CPC .......... C09K 3/1009; C09K 2003/1084; F16L 25/0081; F16J 15/02; F16J 15/022
See application file for complete search history.

(56) References Cited

U.S. PATENT DOCUMENTS

| | | | | |
|---|---|---|---|---|
| 4,060,250 | A * | 11/1977 | Davis | F04D 29/02 415/217.1 |
| 5,368,315 | A * | 11/1994 | Viksne | F16J 15/104 277/944 |
| 12,264,259 | B2 * | 4/2025 | Yasunaga | F16J 15/324 |
| 2011/0148050 | A1 * | 6/2011 | Vissing | B05D 7/04 277/650 |
| 2018/0036490 | A1 * | 2/2018 | Minagawa | F16J 1/003 |
| 2018/0340052 | A1 * | 11/2018 | Pitolaj | C08K 3/22 |

FOREIGN PATENT DOCUMENTS

| | | | |
|---|---|---|---|
| JP | 2002502735 | A | 1/2002 |
| JP | 2014196779 | A | 10/2014 |

* cited by examiner

*Primary Examiner* — Gilbert Y Lee
(74) *Attorney, Agent, or Firm* — Canon U.S.A., Inc. IP Division

(57) ABSTRACT

A sealing member includes a substrate, and a coating layer on the surface of the substrate. The substrate includes a polytetrafluoroethylene matrix having a porous structure with pores that contain alumina particles, and the coating layer is made of a condensate of an organosilicon compound.

13 Claims, No Drawings

SEALING MEMBER AND METHOD FOR MANUFACTURING THE SAME

BACKGROUND

Technical Field

The present disclosure relates to sealing members, particularly to a sealing member used in pipes and devices that come into contact with polymerizable monomers, and to a method for manufacturing the sealing member.

Description of the Related Art

Pipes and devices use sealing members.

Japanese Patent Laid-Open No. 2014-196779 discloses a fluororesin gasket as a sealing member for piping. The fluororesin gasket contains fluororesin and inorganic particles of at least either silicon carbide or α-alumina, and the volume ratio of the fluororesin to the inorganic particles (fluororesin/inorganic particles) is 40/60 to 55/45. This fluororesin gasket is thought to be resistant to deformation even at high temperatures.

PCT Japanese Translation Patent Publication No. 2002-502735 discloses a composite material that can be used for manufacturing a gasket. The composite material is produced by coating an expanded polytetrafluoroethylene (ePTFE) that may contain particulate fillers with silicone or any other liquid elastomer. This composite material has high bending resistance, but unfortunately, when used in sealing members in pipes or devices that come into contact with polymerizable monomers, it allows the polymerizable monomer to penetrate the sealing member and polymerize within the sealing member, thereby damaging the sealing member. Furthermore, in the sealing members used for piping, polymerizable monomers penetrate the sealing member and polymerizes in the sealing member to form a polymer, which can clog pipes.

Polytetrafluoroethylene (hereinafter abbreviated to PTFE) is highly resistant (solvent-resistant) to many chemicals and, therefore, can be used in sealing members. Accordingly, the use of PTFE in the substrate of the sealing member can be a measure against the above disadvantages. However, when sealing members are formed using PTFE, injection molding cannot be applied because PTFE is insoluble in many solvents. Accordingly, compression firing using the powder or pellets as the raw material is generally applied. Compression firing can produce molded products with visually smooth surfaces. However, when the surfaces of the PTFE molded products are observed by scanning electron microscopy (SEM) or the like, the surfaces have holes or pores similar to interfiber gaps formed when fibers unravel. In the case of adding fillers or the like to PTFE to improve the mechanical properties of the sealing member before compression firing, holes or pores similar to interfiber gaps formed when fibers unravel, or fibrous PTFE, are more frequently observed. Such microscopic holes and pores not visible to the naked eye do not cause disadvantages when the sealing member is used for ordinary fluids. However, when the sealing member is used for polymerizable monomers, the polymerizable monomer gradually penetrates the sealing member through the microscopic holes or pores and polymerizes in the sealing member, causing disadvantages.

In Japanese Patent Laid-Open No. 2014-196779, PTFE, which is highly solvent-resistant, may be selected as the fluororesin (see paragraph [0010] in Japanese Patent Laid-Open No. 2014-196779). However, even in the sealing member using PTFE in the substrate, when the sealing member is used for a long period, some polymerizable monomers may penetrate the sealing member and damage it, or the polymerizable monomer may penetrate the inside of the sealing member and polymerize to form a polymer there.

The substrate disclosed in PCT Japanese Translation Patent Publication No. 2002-502735, which includes a coating layer made of silicone or any other liquid elastomer and a PTFE matrix containing particulate fillers such as silica particles, also causes the same phenomena as in Japanese Patent Laid-Open No. 2014-196779 in some cases.

Accordingly, there is a need for a sealing member that has high mechanical properties as required for sealing and that, over a long period, is not damaged and can prevent polymerizable monomers from producing polymers that can cause clogging.

SUMMARY

The present disclosure provides a sealing member including a substrate and a coating layer on the surface of the substrate. The substrate includes a polytetrafluoroethylene matrix having a porous structure with pores that contain alumina particles, and the coating layer is made of a condensate of an organosilicon compound.

Further features of the present disclosure will become apparent from the following description of exemplary embodiments.

DESCRIPTION OF THE EMBODIMENTS

Exemplary embodiments of the present disclosure will now be described. However, it should be appreciated that the implementation of the invention is not limited to the following embodiments.

In the description provided herein, the expressions representing numerical ranges, such as "XX or more and YY or less" and "XX to YY", refer to ranges including the lower and upper limits that are the endpoints, unless otherwise noted. When some numerical ranges are presented in steps, the lower and upper limits of the respective ranges may be combined as desired.

Features of the Disclosure

The present disclosure provides a sealing member including a substrate and a coating layer on the surface of the substrate. The substrate includes a polytetrafluoroethylene matrix having a porous structure with pores that contain alumina particles, and the coating layer is made of a condensate of an organosilicon compound.

Substrate

Polytetrafluoroethylene Matrix

The polytetrafluoroethylene matrix has a porous structure. The polytetrafluoroethylene matrix has pores (air gaps) therein such as holes, tiny openings, or spaces similar to interfiber gaps formed when fibers unravel. Thus, the polytetrafluoroethylene matrix allows alumina particles to be present in the pores, having a structure containing alumina particles in the pores. The porous structure may be a continuous gap structure in which the air gaps (pores) interconnect or an independent gap structure in which the air gaps are independent of each other.

Alumina Particles

The alumina particles have basic activity at least at the surfaces.

The material of alumina particles includes α-alumina, intermediate aluminas other than α-alumina, and their composites. Intermediate alumina is the generic term for alumina other than α-alumina, and examples include γ-alumina, δ-alumina, θ-alumina, η-alumina, κ-alumina, and their composites. In some embodiments, α-alumina particles are used.

The size and shape of the alumina particles are not limited, provided that the alumina particles can be present in the pores in the polytetrafluoroethylene matrix.

Coating Layer

The coating layer is made of an organosilicon compound. The coating layer may be formed by condensing an organosilicon compound, and hence, it may be a layer made of a condensate of the organosilicon compound. The organosilicon compound is represented by the following formula:

$$R^1—Si—(R^2)_3$$

In the formula, $R^1$ may be an alkyl group with 1 to 5 carbon atoms, for example, an alkyl group with 1 to 4 carbon atoms. In some embodiments, it is an alkyl group with 1 or 2 carbon atoms. The alkyl group may be linear, branched, or cyclic and, in some embodiments, may be linear or branched. The alkyl group may have one or more substituents. As the number of carbon atoms of $R^1$ is smaller, the crosslinking density increases, preventing the penetration of polymerizable monomers more effectively.

Each $R^2$ in the formula may be independently a halogen atom or an alkoxy group with 1 to 4 carbon atoms and, in some embodiments, may be an alkoxy group with 1 or 2 carbon atoms.

Examples of the compounds of the above formula include methyltrimethoxysilane, methyltriethoxysilane, methyltrichlorosilane, ethyltrimethoxysilane, ethyltriethoxysilane, ethyltrichlorosilane, propyltrimethoxysilane, propyltriethoxysilane, propyltrichlorosilane, isobutyltrimethoxysilane, isobutyltriethoxysilane, isobutyltrichlorosilane, pentyltrimethoxysilane, pentyltriethoxysilane, pentyltrichlorosilane, and hexyltrimethoxysilane. Such compounds may be used individually or in combination. In some embodiments, the organosilicon compound may be methyltrimethoxysilane, propyltrimethoxysilane, isobutyltrimethoxysilane, or methyltriethoxysilane, and particularly methyltrimethoxysilane or methyltriethoxysilane.

The thickness of the coating layer may be, but is not limited to, in the range of 1 nm to 65 nm. In some embodiments, the thickness of the coating layer is in the range of 5 nm to 50 nm. The coating layer with a thickness of 5 nm or more can reliably prevent polymerizable monomers from penetrating the PTFE matrix. Also, the coating layer with a thickness of 50 nm or less maintains the adhesion to the PTFE matrix and enhances the mechanical properties of the sealing member. In some embodiments, the thickness is in the range of 20 nm to 40 nm. The thickness of the coating layer can be controlled by adjusting the number of times of the operation from immersion to drying or the drying temperature in the coating layer formation or the pH of the hydrolyzed organosilicon compound solution.

In some embodiments, the condensate of the organosilicon compound is also present in the pores (air gaps) in the polytetrafluoroethylene matrix.

The present inventors believe that the reason for the advantageous effects of the present disclosure is as follows.

In the concept of the present disclosure, a coating layer is formed of a condensate of an organosilicon compound on the surface of the substrate. Thus, in the sealing member, the pores (holes, tiny openings, spaces similar to interfiber gaps formed when fibers unravel, or the like) in the PTFE matrix, which polymerizable monomers can penetrate, are covered with the coating layer or filled with the organosilicon compound. Therefore, the penetration of the polymerizable monomer is expected to be prevented. In general, when a coating layer is formed on the surface of a substrate by condensation of an organosilicon compound, the acidity or basicity at the surface of the substrate is important. When the substrate surface is highly acidic, the organosilicon compound is stable at the interface with the substrate, and the condensate of the organosilicon compound is likely to take a two-dimensional single-layer structure. In contrast, when the substrate surface is highly basic, the organosilicon compound is unstable at the interface with the substrate, and the condensate of the organosilicon compound is likely to take a three-dimensional network structure. It is known that the surfaces of alumina particles, which are used herein, are more basic than the surfaces of silica particles, which are used in PCT Japanese Translation Patent Publication No. 2002-502735. Therefore, the substrate described herein is expected to have a basic surface because of the presence of alumina particles in the substrate, and accordingly, the organosilicon compound condensate of the resulting coating layer probably has a three-dimensional network structure. Thus, it is expected that the sealing member will maintain its mechanical properties and prevent the penetration of polymerizable monomers over a long period.

The sealing member may be used as, for example, a gasket, an O-ring, or a packing. In particular, when the sealing member is used for fixing, for example, as a gasket, the coating layer of the sealing member is maintained for a long period, producing the intended effects of the present disclosure. Hence, in some embodiments, the sealing member is used as a gasket. The sealing member with the above-described structure can be used in pipes and devices (particularly those that come into contact with polymerizable monomers).

Method for Manufacturing the Sealing Member

A method for manufacturing the sealing member disclosed herein will now be described, but the method is not intended to limit the implementation of the present disclosure. Also, known methods may be used without particular limitation.

Substrate Formation

In the process of manufacturing the sealing member, the substrate may be formed by a known method. For example, a raw material containing PTFE (matrix) and alumina particles may be filled into a mold and subjected to compression molding at a surface pressure of 20 MPa to 60 MPa, and the resulting molded product is fired at a temperature of 350° C. to 370° C. Alternatively, the raw material may be subjected to melt molding. A fired hollow cylinder may be cut in the periphery in the longitudinal direction to form a sheet, followed by punching the sheet into an annular shape. PTFE and alumina particles may be mixed in any order without limitation.

Formation of Coating Layer on Substrate

The coating layer can be formed on the substrate by a condensation reaction of an organosilicon compound. In some embodiments, the organosilicon compound is hydrolyzed before the condensation to form the coating layer. Also, the coating layer may be formed by impregnating the substrate with the hydrolyzed organosilicon compound solution, followed by drying. For example, the substrate is immersed in the hydrolyzed organosilicon compound solution under atmospheric pressure or reduced pressure for impregnation. The hydrolysis may be performed in a vessel equipped with a stirrer. More specifically, for example, 100 parts by mass of an organosilicon compound is mixed with 40 to 500 parts by mass of deionized water, such as ion-exchanged water or RO water, and hydrolyzed under the conditions of 2 pH to 7 pH and 15° C. to 80° C. for 30 minutes to 600 minutes to yield a hydrolyzed solution.

Impregnation Step

In some embodiments, after the hydrolysis of the organosilicon compound, the hydrolyzed organosilicon compound solution is cooled to 20° C. or less and poured into a vessel, and the substrate is immersed in the hydrolyzed organosilicon compound solution in the vessel for impregnation. The time for impregnation may be set to, but is not limited to, 30 minutes to 48 hours. Impregnation may be repeated as needed. Impregnation may be performed under atmospheric pressure, or a part of the impregnation may be performed under reduced pressure. For the impregnation with the hydrolyzed organosilicon compound solution, the substrate may be immersed under reduced pressure to expel the air in the substrate. This enables the hydrolyzed organosilicon compound solution to permeate the substrate without gaps or pores. The reduced pressure may be, but is not limited to, −0.04 MPa to −0.10 MPa. For example, it may be −0.05 MPa to −0.10 MPa and is, in some embodiments, −0.09 MPa to 0.10 MPa.

The pH of the hydrolyzed organosilicon compound solution may be adjusted with a hydrochloric acid or sodium carbonate aqueous solution before immersing the substrate. In some embodiments, 10 mass % hydrochloric acid or sodium carbonate aqueous solution may be used to adjust the pH.

The pH may be 2.0 to 9.0. The pH value affects the condensation rate of the hydrolyzed organosilicon compound solution. Accordingly, in some embodiments, the pH is adjusted from 3.0 to 8.0. Specifically, when the pH is less than 3.0, the condensation reaction of the hydrolyzed organosilicon compound solution proceeds slowly, and the coating layer is not easily formed, less likely to prevent the penetration of polymerizable monomers. When the pH exceeds 8.0, the hydrolyzed organosilicon compound solution is likely to condense to increase the thickness of the coating layer, but the formation of the coating layer tends to be uneven. Consequently, it is likely to be difficult to prevent the penetration of monomers while the mechanical properties are maintained. The pH of the hydrolyzed organosilicon compound solution in the range of 3.0 to 8.0 enables the sealing member to reliably maintain the mechanical properties and ensures the formation of the coating layer that can prevent the penetration of polymerizable monomers.

Drying Step

In the present disclosure, the coating layer is formed by drying the hydrolyzed organosilicon compound solution after impregnating the substrate with the hydrolyzed solution. The drying temperature may be in the range of 10° C. to 50° C., for example, 20° C. to 40° C. When the drying temperature is less than 20° C., the condensation reaction of the hydrolyzed organosilicon compound solution proceeds slowly, and the coating layer is not easily formed, less likely to prevent the penetration of polymerizable monomers. When the drying temperature exceeds 40° C., the hydrolyzed organosilicon compound solution is likely to condense to increase the thickness of the coating layer, but the formation of the coating layer tends to be uneven. Consequently, it is likely to be difficult to prevent the penetration of polymerizable monomers while the mechanical properties are maintained. Drying at a temperature of 20° C. to 40° C. enables the sealing member to reliably maintain the mechanical properties and ensures the formation of the coating layer that can prevent the penetration of polymerizable monomers.

The impregnation and drying steps described above may be considered a series of steps, and the series may be performed only once or may be repeated multiple times as needed. For example, the series of steps from the impregnation to the drying may be performed once to four times.

The amount of the Si element derived from the organosilicon compound in the entire sealing member may be, but is not limited to, in the range of 2 atomic % to 50 atomic %. In some embodiments, the amount of Si derived from the organosilicon compound in the entire sealing member is in the range of 10 atomic % to 40 atomic %. The sealing member containing 10 atomic % or more of Si as a whole can reliably prevent the penetration of polymerizable monomers. Also, the sealing member containing 40 atomic % or less of Si as a whole exhibits enhanced mechanical properties. In some embodiments, the Si content of the entire sealing member may be in the range of 20 atomic % to 30 atomic %. The amount of Si derived from the organosilicon compound can be controlled by adjusting the number of times of the operation from immersion to drying or the drying temperature in the coating layer formation or the pH of the hydrolyzed organosilicon compound solution.

The amount of the Al element in the sealing member (entire sealing member) may be, but is not limited to, in the range of 0.4 atomic % to 9.8 atomic %, for example. In some embodiments, the amount of Al in the sealing member is in the range of 0.8 atomic % to 4.6 atomic %. In the sealing member containing 0.8 atomic % or more of Al, the condensate of the organosilicon compound is more likely to form a three-dimensional network structure favorably. Also, the sealing member containing 4.6 atomic % or less of Al exhibits enhanced mechanical properties. In some embodiments, the amount of Al in the sealing member is in the range of 2.0 atomic % to 4.0 atomic %. The amount of Al in the sealing member can be controlled by adjusting the amount of alumina particles (in some embodiments, α-alumina particles) to be added in the manufacture of the sealing member.

Measurements of Physical Properties

The measurement methods of physical properties of the sealing member disclosed herein will now be described.

Measurement of Coating Layer Thickness

The thickness of the coating layer can be measured, for example, as follows.

For the sealing member used as a gasket, the gasket is cut into a piece of 1 cm square as a sample. Platinum is vapor-deposited on the surface of the sample for 100 seconds to coat the sample. The sample is cut 100 μm lengthwise and crosswise each in the depth direction under the following conditions, using FIB-SEM, Helios G4 US (trade name) manufactured by Thermo Fisher Scientific.

Cutting Conditions

Acceleration voltage: 30.0 kV
Current: 2.5 nA
Sample tilt: 520
Working distance (WD): 4 mm The cross-section of the cut sample is observed by scanning electron microscopy (SEM) under the following conditions.

Observation Conditions

Detectors: SE, BSE
Acceleration voltage: 2.0 kV
Current: 0.1 nA
UC mode: ON

Sample tilt: 520

WD: 4 mm

The average thickness of the coating layer is determined from the backscattered electron image obtained with the BSE detector using an image processing software program (available from ImageJ, https://imagej.nih.gov/ij/). Specifically, the coating layer is identified from the shape of the secondary image obtained with the SE detector and the contrast of the backscattered electron image obtained with the BSE detector. In the backscattered electron image obtained with the BSE detector, the length from the sample surface to the substrate surface is measured as the thickness of the coating layer. In the obtained image, thicknesses are measured at all pixel positions in the longitudinal direction of the cross-section and integrated for averaging.

Measurements of Organosilicon Compound-derived Si Content of the Sealing Member and Al Content of the Sealing Member The amount (atomic %) of the Si element derived from the organosilicon compound in the sealing portion (entire sealing member) and the amount (atomic %) of the Al element in the sealing member can be calculated through surface composition analysis by, for example, X-ray photoelectron spectroscopy (also called electron spectroscopy for chemical analysis (ESCA)). For such analysis, the target elements can be C (carbon), O (oxygen), F (fluorine), Si (silicon), and Al (aluminum).

Specifically, before the measurement, the sealing member is embedded in a visible light-curable resin for embedding (D-800, produced by Nisshin EM Co., Ltd.) and cut into a 70 nm-thick thin sample piece with an ultrasonic ultramicrotome (UC7, Leica Co., Ltd.). For determining the amount (atomic %) of the Si element derived from the organosilicon compound in the sealing member, the face of the thin sample piece corresponding to the face to be wetted of the sealing member is measured. For determining the amount (atomic %) of the Al element in the sealing member, the face corresponding to the face of the sealing member perpendicular to the face to be wetted, that is, the section of the sealing member, is measured.

The ESCA apparatus and the measurement conditions are as follows.

Apparatus used: Quantes, manufactured by ULVAC-PHI, Inc.

ESCA (X-ray photoelectron spectrometer) measurement conditions: X-ray source: Al-Kα

X-ray: 100 μm, 25 W, 15 kV

Raster: 300 μm×200 μm

Pass Energy: 69.0 eV

Step Size: 0.125 eV

Neutralization electron gun: 20 μA (Emission)

Ar ion gun: 5 mA (Emission)

Number of Sweeps: 30 for Si, 40 for Al, 10 for C, 10 for O, 10 for F

The amounts in atomic % of C, O, F, Si, and Al elements obtained from the peak intensities for these elements are standardized so that the total amount is 100 atomic %, and the amount (atomic %) of Si presence thus obtained is determined as the amount of the Si element derived from the organosilicon compound in the sealing member (organosilicon compound-derived Si content of the sealing member).

Similarly, the amounts in atomic % of C, O, F, Si, and Al elements obtained from the peak intensities for these elements are standardized so that the total amount is 100 atomic %, and the amount (atomic %) of Al presence thus obtained is determined as the amount of the Al element in the sealing member (Al content of the sealing member).

Observation of Sealing Member Cross-Section

The state of the alumina particles and organosilicon compound in the pores of the sealing member can be seen by observing the cross-section of the sealing member, for example, under a scanning electron microscope (SEM).

Specifically, the cross-section of the sealing member may be observed according to the following procedure.

The sealing member is embedded in a visible light-curable resin for embedding (D-800, produced by Nisshin EM Co., Ltd.) and cut into 70 nm-thick thin sample pieces with an ultrasonic ultramicrotome (UC7, Leica Co., Ltd.).

Ten of the sample pieces cut in the direction perpendicular to the face corresponding to the face to be wetted of the sealing member are randomly selected from the thin sample pieces. After being subjected to the following pretreatment, the selected sample pieces are observed by scanning electron microscopy (SEM).

Pretreatment: Spreading the Sample Pieces Over a Carbon Tape (and Pt Vapor Deposition)

For SEM observation, a scanning electron microscope, "Ultraplus" (trade name), manufactured by Carl Zeiss AG., may be used. Alumina particles and the organosilicon compound are observed in the scanning electron micrograph of the cross-section of the sealing member.

The alumina particles and organosilicon compound are observed with EDS (UltraDry EDS detector (trade name) manufactured by ThermoFisher Scientific) at an acceleration voltage of 10 kV, a magnification of 2000 times, and a working distance of 8 mm to check for the presence of the Al peak derived from the alumina particles and the Si peak derived from the organosilicon compound.

Method for Polymer Production

The present disclosure provides a method for producing a polymer by polymerizing at least one polymerizable monomer.

The method includes transferring the polymerizable monomer into a polymerization container through a transferring path. The transferring path includes a plurality of pipes connected together, and a connection between the pipes is sealed with the sealing member or a sealing member manufactured by the above-described manufacturing method of the sealing member.

EXAMPLES

The present disclosure will be further described in detail with reference to the following Examples and Comparative Examples, which are not intended to limit the implementation of the present disclosure unless departing from the scope and spirit of the invention. In the following Examples, "part(s)" is on a mass basis unless otherwise specified.

Example 1

Formation of Substrate

Polytetrafluoroethylene powder and α-alumina particles were mixed so that the amount of Al derived from the α-alumina particles in the substrate was 3.0 atomic %, and the mixture was subjected to compression molding by being compressed up and down in a mold at a pressure of 40 MPa for 5 minutes. With the pressure being applied, the compressed material was heated to 350° C., kept at this temperature for 10 minutes, and then cooled, thus forming a molded product. The molded product was turned into a 3 mm-thick sheet, which is Sheet A, with a lathe.

Sheet A was punched into rings of 101 mm in outer diameter and 61 mm in inner diameter. Two rings were formed as sheets B.

Formation of Coating Layer

The coating layer was formed according to the following procedure.

(1) Ion-exchanged water in an amount of 60.0 parts was placed into a reaction vessel equipped with a stirrer and a thermometer and adjusted to a pH of 3.0 with 10 mass % hydrochloric acid solution. The water was heated to 70° C. while being stirred. Then, 40.0 parts of methyltrimethoxysilane, or organosilicon compound, was added and stirred for 2 hours or more for hydrolysis. The hydrolysis was conducted with visual observation until the endpoint when the hydrolyzing solution became a single phase without separating into two or more phases, and the solution was cooled to 20° C. to yield a hydrolyzed solution of the organosilicon compound.

(2) The resulting hydrolyzed organosilicon compound solution was adjusted to a pH of 5.0 with 10 mass % sodium carbonate aqueous solution.

(3) The hydrolyzed organosilicon compound solution after pH adjustment and Sheets B were placed in a container, and the container was placed in a vacuum dryer. The vacuum dryer was set to a pressure (pressure in the first half) of −0.10 MPa and left for 30 minutes. Then, the pressure of the vacuum dryer was returned to atmospheric pressure (pressure in the second half), and the container removed from the dryer was allowed to stand at room temperature and normal pressure for 24 hours with Sheets B immersed in the hydrolyzed solution.

(4) Sheets B, thus impregnated with the hydrolyzed organosilicon compound solution, were removed from the container and dried at 30° C. for 72 hours in a dryer.

A series of (3)-(4) steps in the above-described coating layer formation was performed twice to yield Sheets C, which were coated with a condensate of the organosilicon compound. Two Sheets C were produced.

For one of Sheets C, the presence of the organosilicon compound was examined by measuring the thickness of the coating layer and the Si and Al contents of the entire sheet and analyzing the cross-section of the sheet by EDS. The results are presented in Table 2.

Adherence Resulting from Immersion

The other of Sheets C was placed in a metal container after the mass of the sheet was measured, and styrene was poured into the container until the Sheet C was completely immersed. The container was heated to 100° C., removed after 20 hours, and air-dried in a fume hood for 4 hours. The operation of immersing the sheet in styrene in the container for 20 hours and air-drying the sheet in the fume hood for 4 hours was performed 6 times in total. Then, the sheet was air-dried in the fume hood for 72 hours, and the mass after air-drying was measured. The increase in mass (mass change) was calculated, and the degree of adherence resulting from the immersion was evaluated according to the following criteria. The results are presented in Table 3.

Criteria of Adherence Resulting from Immersion

Evaluation was based on the range of mass changes.

A: Mass change was 0.50% or less;

B: Mass change was in the range of more than 0.50% to 0.70%;

C: Mass change was in the range of more than 0.70% to 0.90%; and

D: Mass change was more than 0.90%.

Examination of Mechanical Properties (Measurement of Compression Set)

Mechanical properties were evaluated by measuring the compression set.

The compression set is the percent of deformation remaining even after the removal of the compression force for 25% compression at 150° C. for 70 hours. Specifically, the compression set was measured according to the following procedure:

(1) Take a test piece of 10 mm×10 mm×2 mmt from the sealing member.

(2) Hold the test piece of the sealing member 25% compression deformed at 150° C. for 70 hours.

(3) Remove the force that causes compression deformation. Release the test piece from the compression under the following conditions:

Temperature at release: 23° C.

Releasing time: 0.5 hours (4) The test piece, once released from compression, attempts to return to its shape before compression (restored).

The compression set is the deformation remaining after the force causing compression deformation is removed, expressed as a percentage. Hence, if the shape of the test piece after being released from the compression is the same as the shape before the release, that is, the shape deformed by compression, the compression set is 100%. In contrast, if the test piece completely returns to the shape before compression, the compression set is 0%. The results are presented in Table 3.

Evaluation of Creep Resistance

The creep resistance was evaluated based on the compression set measured above. The results are presented in Table 3.

Criteria of Creep Resistance

A: Compression set was 5.0% or less.

B: Compression set was more than 5.0% to 7.0%

C: Compression set was more than 7.0%.

Example 2

Sheets were formed and examined in the same manner as in Example 1, except that the hydrolyzed organosilicon compound solution was adjusted to a pH of 3.0 with 10 mass % hydrochloric acid solution, as presented in Table 1.

Example 3

Sheets were formed and examined in the same manner as in Example 1, except that the hydrolyzed organosilicon compound solution was adjusted to a pH of 8.0 with 10 mass % sodium carbonate aqueous solution, as presented in Table 1.

Example 4

Sheets were formed and examined in the same manner as in Example 1, except that the hydrolyzed organosilicon compound solution was adjusted to a pH of 2.0 with 10 mass % hydrochloric acid solution, as presented in Table 1.

Example 5

Sheets were formed and examined in the same manner as in Example 1, except that the hydrolyzed organosilicon compound solution was adjusted to a pH of 9.0 with 10 mass % sodium carbonate aqueous solution, as presented in Table 1.

Example 6

Sheets were formed and examined in the same manner as in Example 1, except that the hydrolyzed organosilicon compound solution was adjusted to a pH of 7.0 with 10 mass % sodium carbonate aqueous solution and a series of (3)-(4) steps in the formation of the coating layer was performed once in total, as presented in Table 1.

Example 7

Sheets were formed and examined in the same manner as in Example 1, except that the hydrolyzed organosilicon compound solution was adjusted to a pH of 4.0 with 10 mass % sodium carbonate aqueous solution and a series of (3)-(4) steps in the formation of the coating layer was performed three times in total, as presented in Table 1.

Example 8

Sheets were formed and examined in the same manner as in Example 1, except that the hydrolyzed organosilicon compound solution was adjusted to a pH of 8.0 with 10 mass % sodium carbonate aqueous solution and a series of (3)-(4) steps in the formation of the coating layer was performed once in total, as presented in Table 1.

Example 9

Sheets were formed and examined in the same manner as in Example 1, except that a series of (3)-(4) steps in the formation of the coating layer was performed four times in total, as presented in Table 1.

Example 10

Sheets were formed and examined in the same manner as in Example 1, except that polytetrafluoroethylene powder and α-alumina particles were mixed so that the amount of Al derived from the α-alumina particles in the substrate was 1.0 atomic %, as presented in Table 1.

Example 11

Sheets were formed and examined in the same manner as in Example 1, except that polytetrafluoroethylene powder and α-alumina particles were mixed so that the amount of Al derived from the α-alumina particles in the substrate was 5.0 atomic %, as presented in Table 1.

Example 12

Sheets were formed and examined in the same manner as in Example 1, except that polytetrafluoroethylene powder and α-alumina particles were mixed so that the amount of Al derived from the α-alumina particles in the substrate was 0.5 atomic %, as presented in Table 1.

Example 13

Sheets were formed and examined in the same manner as in Example 1, except that polytetrafluoroethylene powder and α-alumina particles were mixed so that the amount of Al derived from the α-alumina particles in the substrate was 10.0 atomic %, as presented in Table 1.

Example 14

Sheets were formed and examined in the same manner as in Example 1, except that the organosilicon compound for the coating layer was replaced with propyltrimethoxysilane, as presented in Table 1.

Example 15

Sheets were formed and examined in the same manner as in Example 1, except that the organosilicon compound for the coating layer was replaced with isobutyltrimethoxysilane, as presented in Table 1.

Example 16

Sheets were formed and examined in the same manner as in Example 1, except that the organosilicon compound for the coating layer was replaced with hexyltrimethoxysilane, as presented in Table 1.

Example 17

Sheets were formed and examined in the same manner as in Example 1, except that in the formation of the coating layer, the manner for impregnation of the sheet with the hydrolyzed organosilicon compound solution was altered to application under atmospheric pressure with the sheet immersed in the hydrolyzed solution, as presented in Table 1.

Example 18

Sheets were formed and examined in the same manner as in Example 1, except that in the formation of the coating layer, the pressure in the first half in the vacuum dryer was changed from −0.10 MPa to atmospheric pressure, and the coating layer formation was performed under atmospheric pressure at all times, as presented in Table 1.

Example 19

Sheets were formed and examined in the same manner as in Example 1, except that in the formation of the coating layer, the pressure in the first half in the vacuum dryer was changed from −0.10 MPa to −0.09 MPa, as presented in Table 1.

Example 20

Sheets were formed and examined in the same manner as in Example 1, except that in the formation of the coating layer, the pressure in the first half in the vacuum dryer was changed from −0.10 MPa to −0.05 MPa, as presented in Table 1.

Example 21

Sheets were formed and examined in the same manner as in Example 1, except that in the formation of the coating layer, the pressure in the first half in the vacuum dryer was changed from −0.10 MPa to −0.04 MPa, as presented in Table 1.

Example 22

Sheets were formed and examined in the same manner as in Example 1, except that in the formation of the coating layer, the temperature for drying the sheet impregnated with the hydrolyzed organosilicon compound solution was changed to 20° C., as presented in Table 1.

Example 23

Sheets were formed and examined in the same manner as in Example 1, except that in the formation of the coating layer, the temperature for drying the sheet impregnated with the hydrolyzed organosilicon compound solution was changed to 40° C., as presented in Table 1.

Example 24

Sheets were formed and examined in the same manner as in Example 1, except that in the formation of the coating layer, the temperature for drying the sheet impregnated with the hydrolyzed organosilicon compound solution was changed to 10° C., as presented in Table 1.

Example 25

Sheets were formed and examined in the same manner as in Example 1, except that in the formation of the coating layer, the temperature for drying the sheet impregnated with the hydrolyzed organosilicon compound solution was changed to 50° C., as presented in Table 1.

Comparative Example 1

Sheets were formed of only polytetrafluoroethylene powder without mixing with α-alumina particles, as presented in Table 1. Other operations were conducted in the same manner as in Example 1 for the formation and examination of the sheets.

Comparative Example 2

Sheets were formed and examined in the same manner as in Example 1, except that no coating layer was formed, as presented in Table 1. Other operations were conducted in the same manner as in Example 1 for the formation and examination of the sheets.

Comparative Example 3

As presented in Table 1, α-alumina particles were replaced with fumed silica particles. The fumed silica particles were mixed with polytetrafluoroethylene powder so that the silicon content of the sealing member was 3.0 atomic %, and thus, sheets were formed. Other operations were conducted in the same manner as in Example 1 for the formation and examination of the sheets.

TABLE 1

| | Substrate makeup | Presence of Coating layer | Organosilicon compound used in coating layer | Impregnation of substrate with hydrolyzed organosilicon compound solution | Pressure (MPa) in impregnation with hydrolyzed organo-silicon compound solution | Drying temperature (° C.) after impregnation | pH of hydrolyzed organo-silicon compound solution | Number of times of series of (3)-(4) steps | Al content (at %) of sheet in substrate formation | Silica-derived Si content (at %) of sheet in substrate formation |
|---|---|---|---|---|---|---|---|---|---|---|
| Example 1 | PTFE + Alumina particles | Yes | Methyl trimethoxysilane | Immersion | −0.10 | 30 | 5 | 2 | 3.0 | 0.0 |
| Example 2 | PTFE + Alumina particles | Yes | Methyl trimethoxysilane | Immersion | −0.10 | 30 | 3 | 2 | 3.0 | 0.0 |
| Example 3 | PTFE + Alumina particles | Yes | Methyl trimethoxysilane | Immersion | −0.10 | 30 | 8 | 2 | 3.0 | 0.0 |
| Example 4 | PTFE + Alumina particles | Yes | Methyl trimethoxysilane | Immersion | −0.10 | 30 | 2 | 2 | 3.0 | 0.0 |
| Example 5 | PTFE + Alumina particles | Yes | Methyl trimethoxysilane | Immersion | −0.10 | 30 | 9 | 2 | 3.0 | 0.0 |
| Example 6 | PTFE + Alumina particles | Yes | Methyl trimethoxysilane | Immersion | −0.10 | 30 | 7 | 1 | 3.0 | 0.0 |
| Example 7 | PTFE + Alumina particles | Yes | Methyl trimethoxysilane | Immersion | −0.10 | 30 | 4 | 3 | 3.0 | 0.0 |
| Example 8 | PTFE + Alumina particles | Yes | Methyl trimethoxysilane | Immersion | −0.10 | 30 | 8 | 1 | 3.0 | 0.0 |
| Example 9 | PTFE + Alumina particles | Yes | Methyl trimethoxysilane | Immersion | −0.10 | 30 | 5 | 4 | 3.0 | 0.0 |
| Example 10 | PTFE + Alumina particles | Yes | Methyl trimethoxysilane | Immersion | −0.10 | 30 | 5 | 2 | 1.0 | 0.0 |
| Example 11 | PTFE + Alumina particles | Yes | Methyl trimethoxysilane | Immersion | −0.10 | 30 | 5 | 2 | 5.0 | 0.0 |
| Example 12 | PTFE + Alumina particles | Yes | Methyl trimethoxysilane | Immersion | −0.10 | 30 | 5 | 2 | 0.5 | 0.0 |
| Example 13 | PTFE + Alumina particles | Yes | Methyl trimethoxysilane | Immersion | −0.10 | 30 | 5 | 2 | 10.0 | 0.0 |
| Example 14 | PTFE + Alumina particles | Yes | Propyl trimethoxysilane | Immersion | −0.10 | 30 | 5 | 2 | 3.0 | 0.0 |
| Example 15 | PTFE + Alumina particles | \| | Isobutyl trimethoxysilane | Immersion | −0.10 | 30 | 5 | 2 | 3.0 | 0.0 |
| Example 16 | PTFE + Alumina particles | Yes | Hexyl trimethoxysilane | Immersion | −0.10 | 30 | 5 | 2 | 3.0 | 0.0 |
| Example 17 | PTFE + Alumina | Yes | Methyl | Application | Atmospheric | 30 | 5 | 2 | 3.0 | 0.0 |

TABLE 1-continued

| | Substrate makeup | Presence of Coating layer | Organosilicon compound used in coating layer | Impregnation of substrate with hydrolyzed organosilicon compound solution | Pressure (MPa) in impregnation with hydrolyzed organosilicon compound solution | Drying temperature (° C.) after impregnation | pH of hydrolyzed organosilicon compound solution | Number of times of series of (3)-(4) steps | Al content (at %) of sheet in substrate formation | Silica-derived Si content (at %) of sheet in substrate formation |
|---|---|---|---|---|---|---|---|---|---|---|
| | particles | | trimethoxysilane | | pressure | | | | | |
| Example 18 | PTFE + Alumina particles | Yes | Methyl trimethoxysilane | Immersion | Atmospheric pressure | 30 | 5 | 2 | 3.0 | 0.0 |
| Example 19 | PTFE + Alumina particles | Yes | Methyl trimethoxysilane | Immersion | −0.09 | 30 | 5 | 2 | 3.0 | 0.0 |
| Example 20 | PTFE + Alumina particles | Yes | Methyl trimethoxysilane | Immersion | −0.05 | 30 | 5 | 2 | 3.0 | 0.0 |
| Example 21 | PTFE + Alumina particles | Yes | Methyl trimethoxysilane | Immersion | −0.04 | 30 | 5 | 2 | 3.0 | 0.0 |
| Example 22 | PTFE + Alumina particles | Yes | Methyl trimethoxysilane | Immersion | −0.10 | 20 | 5 | 2 | 3.0 | 0.0 |
| Example 23 | PTFE + Alumina particles | Yes | Methyl trimethoxysilane | Immersion | −0.10 | 40 | 5 | 2 | 3.0 | 0.0 |
| Example 24 | PTFE + Alumina particles | Yes | Methyl trimethoxysilane | Immersion | −0.10 | 10 | 5 | 2 | 3.0 | 0.0 |
| Example 25 | PTFE + Alumina particles | Yes | Methyl trimethoxysilane | Immersion | −0.10 | 50 | 5 | 2 | 3.0 | 0.0 |
| Comparative Example 1 | PTFE | Yes | Methyl trimethoxysilane | Immersion | −0.10 | 30 | 5 | 2 | 0.0 | 0.0 |
| Comparative Example 2 | PTFE + Alumina particles | No | — | — | — | — | — | — | 3.0 | 0.0 |
| Comparative Example 3 | PTFE + Alumina particles | Yes | Methyl trimethoxysilane | Immersion | −0.10 | 30 | 5 | 2 | 0.0 | 3.0 |

TABLE 2

| | Coating layer thickness (nm) | Organosilicon compound-derived Si content (at %) | Al content (at %) | Silica-derived Si content (at %) | Presence of organosilicon compound in pores |
|---|---|---|---|---|---|
| Example 1 | 30 | 25 | 2.7 | 0.0 | Yes |
| Example 2 | 5 | 30 | 2.7 | 0.0 | Yes |
| Example 3 | 50 | 20 | 2.7 | 0.0 | Yes |
| Example 4 | 2 | 35 | 2.7 | 0.0 | Yes |
| Example 5 | 65 | 15 | 2.7 | 0.0 | Yes |
| Example 6 | 30 | 10 | 2.8 | 0.0 | Yes |
| Example 7 | 30 | 40 | 2.6 | 0.0 | Yes |
| Example 8 | 30 | 5 | 2.8 | 0.0 | Yes |
| Example 9 | 30 | 50 | 2.5 | 0.0 | Yes |
| Example 10 | 5 | 25 | 0.8 | 0.0 | Yes |
| Example 11 | 50 | 25 | 4.6 | 0.0 | Yes |
| Example 12 | 4 | 25 | 0.4 | 0.0 | Yes |
| Example 13 | 60 | 25 | 9.8 | 0.0 | Yes |
| Example 14 | 30 | 20 | 2.7 | 0.0 | Yes |
| Example 15 | 30 | 15 | 2.7 | 0.0 | Yes |
| Example 16 | 30 | 8 | 2.7 | 0.0 | Yes |
| Example 17 | 1 | 2 | 3.0 | 0.0 | No |
| Example 18 | 30 | 25 | 3.0 | 0.0 | No |
| Example 19 | 30 | 25 | 2.8 | 0.0 | Yes |
| Example 20 | 30 | 25 | 2.9 | 0.0 | Yes |
| Example 21 | 30 | 25 | 2.9 | 0.0 | Yes |
| Example 22 | 20 | 25 | 2.7 | 0.0 | Yes |
| Example 23 | 40 | 20 | 2.7 | 0.0 | Yes |
| Example 24 | 4 | 25 | 2.7 | 0.0 | Yes |
| Example 25 | 55 | 20 | 2.7 | 0.0 | Yes |
| Comparative Example 1 | 1 | 2 | No Al | 0.0 | Yes |
| Comparative Example 2 | No coating layer | No coating layer | 3.0 | 0.0 | No/No coating layer |

TABLE 2-continued

| | Coating layer thickness (nm) | Organosilicon compound-derived Si content (at %) | Al content (at %) | Silica-derived Si content (at %) | Presence of organosilicon compound in pores |
|---|---|---|---|---|---|
| Comparative Example 3 | 1 | 5 | 0.0 | 3.3 | Yes |

TABLE 3

| | Mass change (%) | Impregnation fixing | Compression set (%) | Creep resistance |
|---|---|---|---|---|
| Example 1 | 0.30 | A | 4.0 | A |
| Example 2 | 0.45 | A | 3.5 | A |
| Example 3 | 0.20 | A | 5.0 | A |
| Example 4 | 0.70 | B | 3.0 | A |
| Example 5 | 0.15 | A | 6.5 | B |
| Example 6 | 0.40 | A | 3.5 | A |
| Example 7 | 0.20 | A | 5.0 | A |
| Example 8 | 0.70 | B | 3.5 | A |
| Example 9 | 0.20 | A | 6.0 | B |
| Example 10 | 0.50 | A | 3.5 | A |
| Example 11 | 0.20 | A | 5.0 | A |
| Example 12 | 0.60 | B | 4.8 | A |
| Example 13 | 0.20 | A | 7.2 | C |
| Example 14 | 0.40 | A | 3.3 | A |
| Example 15 | 0.45 | A | 3.0 | A |
| Example 16 | 0.75 | C | 2.8 | A |
| Example 17 | 0.80 | C | 2.0 | A |
| Example 18 | 0.55 | B | 4.0 | A |
| Example 19 | 0.35 | A | 4.0 | A |

TABLE 3-continued

| | Mass change (%) | Impreg-nation fixing | Compression set (%) | Creep resistance |
|---|---|---|---|---|
| Example 20 | 0.45 | A | 4.0 | A |
| Example 21 | 0.55 | B | 4.0 | A |
| Example 22 | 0.40 | A | 3.8 | A |
| Example 23 | 0.25 | A | 4.8 | A |
| Example 24 | 0.60 | B | 3.6 | A |
| Example 25 | 0.20 | A | 5.8 | B |
| Comparative Example 1 | 1.15 | D | 1.5 | A |
| Comparative Example 2 | 1.40 | D | 2.0 | A |
| Comparative Example 3 | 0.95 | D | 4.0 | A |

The present invention can provide a sealing member that exhibits high mechanical properties as required for sealing, and that is not damaged over a long period and can prevent the polymerization of polymerizable monomers in the sealing member, even when used in the pipes or devices to come into contact with polymerizable monomers.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-219456 filed Dec. 26, 2023, which is hereby incorporated by reference herein in its entirety.

What is claimed is:

1. A sealing member, comprising:

a substrate including a polytetrafluoroethylene matrix having a porous structure with pores that contain alumina particles;

a coating layer on the surface of the substrate, the coating layer being made of a condensate of an organosilicon compound, the organosilicon compound is represented by the following formula:

$$R^1—Si—(R^2)_3,$$

wherein in the formula, $R^1$ represents an alkyl group with 1 to 5 carbon atoms, and each $R^2$ independently represents a halogen atom or an alkoxy group with 1 to 4 carbon atoms, and the condensate of the organosilicon compound is present in the pores of the polytetrafluoroethylene matrix.

2. The sealing member according to claim 1, wherein the coating layer has a thickness in the range of 5 nm to 50 nm.

3. The sealing member according to claim 1, having an Al element content in the range of 0.8 atomic % to 4.6 atomic %.

4. The sealing member according to claim 1, wherein an amount of an Si element derived from the organosilicon compound in the entire sealing member is in the range of 10 atomic % to 40 atomic %.

5. The sealing member according to claim 1, wherein the sealing member is a gasket.

6. A method for manufacturing a sealing member, the method comprising:

forming a coating layer by impregnating a substrate with a hydrolyzed solution of an organosilicon compound, followed by drying, wherein the sealing member includes:

a substrate including a polytetrafluoroethylene matrix having a porous structure with pores that contain alumina particles therein;

a coating layer on the surface of the substrate, the coating layer being made of a condensate of the organosilicon compound, the organosilicon compound is represented by the following formula:

$$R^1—Si—(R^2)_3,$$

wherein in the formula, $R^1$ represents an alkyl group with 1 to 5 carbon atoms, and each $R^2$ independently represents a halogen atom or an alkoxy group with 1 to 4 carbon atoms, and the condensate of the organosilicon compound is present in the pores of the polytetrafluoroethylene matrix.

7. The method according to claim 6, wherein an impregnation of the substrate with the organosilicon compound is performed by immersing the substrate in a hydrolyzed solution of the organosilicon compound.

8. The method according to claim 7, wherein the substrate is immersed in the hydrolyzed solution of the organosilicon compound under reduced pressure.

9. The method according to claim 8, wherein the reduced pressure is −0.05 MPa to −0.10 MPa.

10. The method according to claim 9, wherein the reduced pressure is −0.09 MPa to −0.10 MPa.

11. The method according to claim 6, wherein the drying is performed at a temperature of 20° C. to 40° C.

12. The method according to claim 6, wherein the hydrolyzed solution of the organosilicon compound has a pH of 3 to 8.

13. A method for producing a polymer by polymerizing at least one polymerizable monomer, the method comprising:

transferring the polymerizable monomer into a polymerization container through a transferring path, the transferring path including a plurality of pipes connected together with a connection between the pipes sealed with a sealing member, wherein the sealing member includes:

a substrate including a polytetrafluoroethylene matrix having a porous structure with pores that contain alumina particles;

a coating layer on the surface of the substrate, the coating layer being made of a condensate of an organosilicon compound, the organosilicon compound is represented by the following formula:

$$R^1—Si—(R^2)_3,$$

wherein in the formula, $R^1$ represents an alkyl group with 1 to 5 carbon atoms, and each $R^2$ independently represents a halogen atom or an alkoxy group with 1 to 4 carbon atoms, and the condensate of the organosilicon compound is present in the pores of the polytetrafluoroethylene matrix.

* * * * *